Dec. 26, 1967   F. C. BADALICH   3,359,668
SLIDE PROJECTOR SUPPORT FOR ROTARY SLIDE TRAY
Filed Nov. 29, 1965
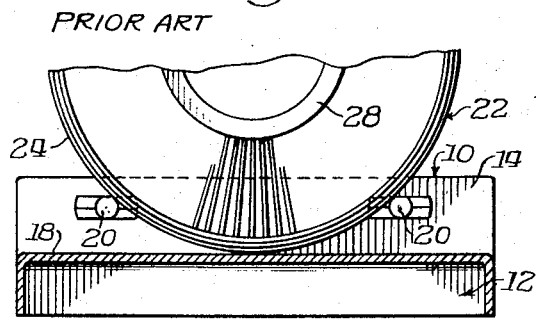
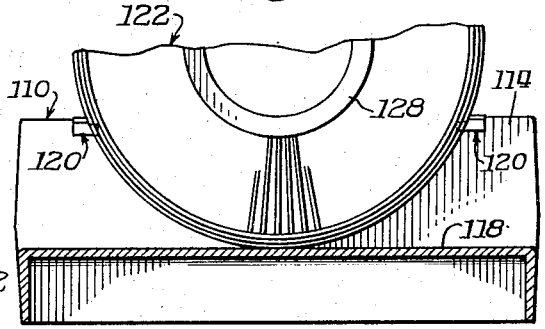
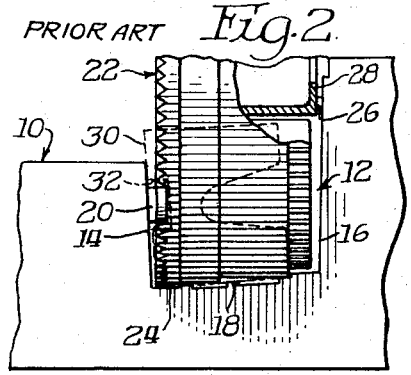
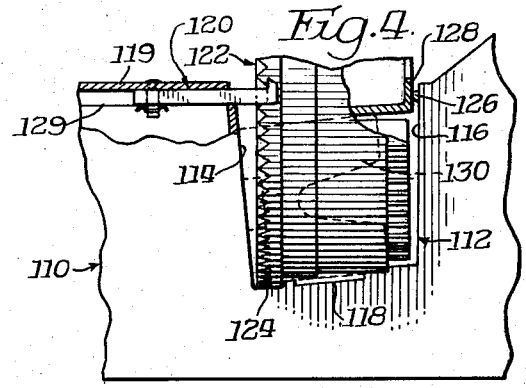
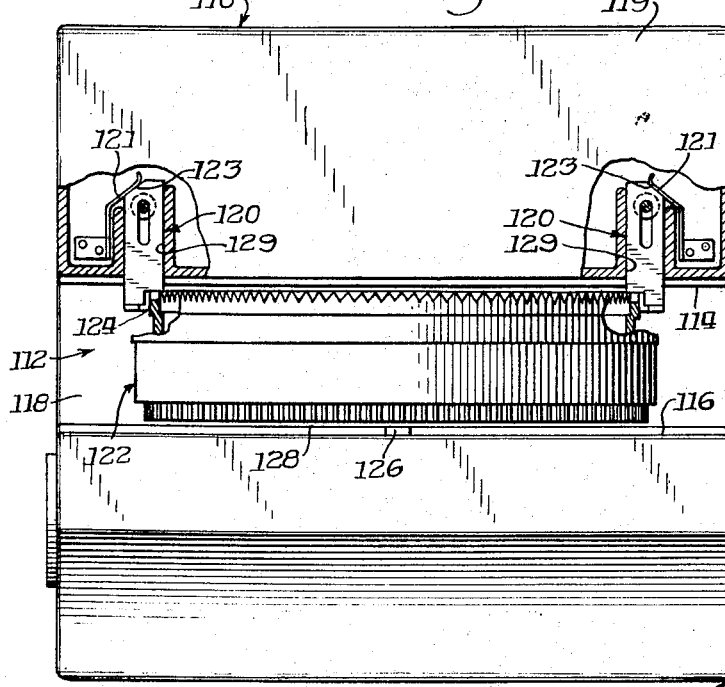
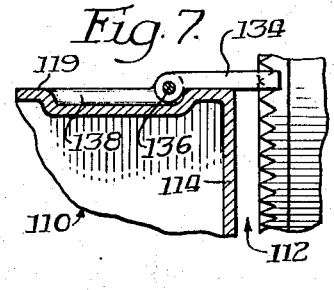
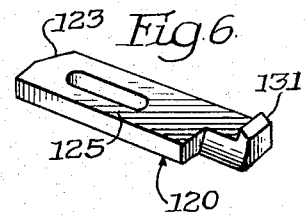
Inventor:
Frank C. Badalich.
By Barry L. Clark
John E. Peele Jr. Attys United States Patent Office 3,359,668
Patented Dec. 26, 1967

3,359,668
SLIDE PROJECTOR SUPPORT FOR ROTARY
SLIDE TRAY
Frank C. Badalich, Chicago, Ill., assignor to Bell &
Howell Company, Chicago, Ill., a corporation of
Illinois
Filed Nov. 29, 1965, Ser. No. 510,268
7 Claims. (Cl. 40—79)

ABSTRACT OF THE DISCLOSURE

A slide projector having an open top slide tray accepting groove in which either a straight slide tray or a rotatable slide tray may be positioned. To support the rotatable slide tray against movement along the groove, a pair of spaced support members are adjusted into the groove from their storage positions near the top of the groove. When straight trays are to be used, the support members are stored so that these trays can be vertically inserted into or removed from the groove.

This invention relates to improvements in slide projections and more particularly to the mounting of a rotary slide tray in such a projector.

Prior art slide projectors such as that shown in U.S. Patent 3,209,647 have a capability of using both a straight and rotary slide tray. However, because of limitations imposed by the use of straight slide trays in such projectors, the mounting for the rotary slide tray is necessarily such that there is a certain degree of instability and uncertainty of operation when this type of tray is used in the projector.

It is an object of this invention to provide a mounting for a rotary slide tray in a slide projector to give stability to the tray when used in the projector.

It is another object of this invention to provide a mounting for a rotary slide tray in a slide projector which assures certainty of indexing operation of the tray in the projector.

It is still another object of this invention to provide a mounting for a rotary slide tray in a slide projector which can be selectively positioned to protrude into the slide tray groove to support the tray.

It is yet another object of this invention to provide a mounting which can be selectively positioned to protrude into a slide tray groove of a slide projector to support a rotary slide tray or into a non-protruding position to enable use of straight slide trays without interference.

Other objects, features and advantages of the present invention will become apparent from the following detailed description taken in conjunction with the accompanying drawings in which:

FIG. 1 is an elevational view of a slide projector and rotary slide tray illustrating the prior art, with a portion of the projector broken away for better illustration;

FIG. 2 is a rear elevational view of the prior art slide projector and rotary tray shown in FIG. 1 with a portion of the tray broken away for better illustration;

FIG. 3 is an elevational view of a slide projector and rotary slide tray illustrating this invention, with a portion of the projector broken away to clearly show the invention;

FIG. 4 is a rear elevational view of the slide projector and rotary slide tray shown in FIG. 3 with portions of the projector and tray broken away to clearly show the invention;

FIG. 5 is a top plan view of the slide projector and rotary slide tray of FIG. 3 with portions of the projector and tray broken away to clearly show the invention;

FIG. 6 is a perspective view of a rotary slide tray support member; and,

FIG. 7 is a view, partly in section, illustrating a modification of the rotary slide tray supporting structure.

Referring to FIGS. 1 and 2 of the drawings, 10 designates generally a prior art slide projector having a slide tray groove 12 comprising side walls 14 and 16, and a bottom wall 18. Protruding into the slide tray groove 12 are a pair of support members 20, 20 which are affixed to the side wall 14. These members peripherally support a rotary slide tray 22 on a rim portion 24 thereof, such rim portion also being supported by the bottom wall 18. Protruding from the side wall 16 is an upper slide guide 26 which contacts an annular face 28 of the slide tray to support the tray vertically in the groove.

The prior art projector 10 can also accommodate a straight slide tray 30 shown in dotted lines in FIG. 2, such a tray having a longitudinal recess 32 along one side. The purpose of the recess is to make the slides in the tray septums available to a pusher member (not shown) which removes the slides from the tray to a projection station (not shown) as well known in the art. The recess 32 in the straight slide tray necessarily restricts the location of the protruding members 20, 20 which must be within the recess in order to permit operation of the projector with straight slide trays. As a result, the peripheral support for a rotary slide tray is quite close (about 1.4 inches in a commercial version) to the bottom of the tray groove. When a rotary slide tray, so mounted, is indexed from one septum to the next by an indexing mechanism (not shown) it has a tendency to roll up on either of the support members 20, 20 dependent upon the direction of rotation. This erratic action is caused by an unstable mounting of the tray and can result in a malfunction such as multiple indexing, particularly if not all of the septums in the circular tray are filled with slides or if the manual indexing control is actuated quickly.

To overcome the above difficulties, the present invention provides a stable mounting for a rotary slide tray in the slide tray groove of a slide projector. Referring to FIGS. 3 through 7, 110 designates generally a slide projector having a slide tray groove 112 comprising side walls 114 and 116, and a bottom wall 118. Mounted for retractable slideable movement beneath a top wall 119 are a pair of members 120, 120 which can be moved to protrude into the slide groove 112 as shown in FIGS. 4 and 5. A detent spring 121 mounted to the underside of the top wall 119 bears against an angular surface 123 of the mounting arm 125 of the member 120 to yieldingly hold member 120 in its tray groove protruding position. By mounting the protruding members 120, 120 at the upper end of side wall 114 a much greater distance above the bottom of the tray groove (2.9 inches as compared to 1.4 inches in the prior art projector) is obtained resulting in a stable peripheral support for a rotary slide tray, such a tray 122 being supported by the members 120, 120 on a rim portion 124 thereof, such rim portion also being supported by the bottom wall 118. The supports 120, 120 contact the tray periphery at points about 136° apart as compared to only 90° in the prior art projector. Protruding from the side wall 116 is an upper slide guide 126 which contacts an annular face 128 of the slide tray to support the tray vertically in the groove.

When a straight tray is to be used in the slide projector, the support members 120, 120 can be pushed into a recess 129 formed in side wall 114 and top wall 119 to clear the tray groove 112. This permits a straight tray to be vertically inserted into the tray groove, such a tray 130 being shown in dotted lines in FIG. 4. Insertion of a straight tray in this manner is not possible in the prior art projector because of the fixed support members 20, 20 preventing such insertion. Finger engageable portions 131 on the end of support member 120 permits the member 120 to be easily pushed into or pulled out of recess 129.

An alternate embodiment of a support member is shown in FIG. 7 comprising a member 134 pivoted at 136 to the top wall 119. When straight trays are to be used, the member 134 is pivoted to lie in a recess 138 provided in the top wall 119.

As can be readily seen from the preceding objects and description, the present invention offers significant advantages in that it provides a support means for a rotary slide tray which insures accurate indexing. In addition, the support means is readily moved out of the tray groove during straight tray operation to facilitate vertical removal of such trays.

I claim as my invention:

1. In a slide projector usable alternatively with rotary or straight slide trays, and having a housing and a substantially vertically-sided open top tray receiving groove defining a portion of said housing into which said trays are positionable through the top of said groove, the improvement comprising:

a pair of rotary tray support members;

means mounting each of said support members for adjustment into and out of tray supporting position near the top and to one side of said tray receiving groove for supporting a rotary tray placed in said groove; and at least one of said support member mounting means and a support member carried thereby, being movable to a storage position wherein a straight tray is movable substantially vertically into and out of said groove past said support members when said members are in said storage position.

2. The projector of claim 1 wherein said support member when in said storage position is contained in a portion of said housing defining a recess in an upper part of the side wall of said slide tray receiving groove; said at least one support member mounting means comprising a longitudinally extending arm portion on said support member slidably movable into and out of said recess.

3. The projector of claim 2 including engageable means on one end of said at least one movable support member adapted to be engaged by an operator for moving said support member into and out of said recess.

4. The projector of claim 2 including means for yieldably holding said at least one movable support member in its operating position.

5. The projector of claim 1 wherein said pair of support members are mounted relative to the slide tray receiving groove so as to support a rotary tray usable in the projector at points spaced apart around the periphery of said tray whereby movement of said tray longitudinally of said groove is prevented.

6. The projector of claim 1 wherein the rotary tray usable with the projector has a predetermined diameter greater than the depth of said groove, and said pair of support members are mounted relative to the slide tray receiving groove so as to engage the periphery of said rotary tray at points spaced above the bottom of the tray receiving groove a distance greater than one fourth and less than one half of the tray diameter.

7. The projector of claim 1 wherein said support member when in said storage position is contained in a portion of said housing adjacent said groove, said portion comprising a recess into which said support member is movable.

References Cited

UNITED STATES PATENTS 3,146,666 9/1964 Misuraca _____ 40—79 X
3,209,647 10/1965 Hall _____ 40—79

EUGENE R. CAPOZIO, *Primary Examiner.*

R. CARTER, *Assistant Examiner.*